United States Patent
Brookner et al.

(10) Patent No.: US 7,916,871 B2
(45) Date of Patent: Mar. 29, 2011

(54) TECHNIQUE FOR SPLIT KNOWLEDGE BACKUP AND RECOVERY OF A CRYPTOGRAPHIC KEY

(75) Inventors: George M. Brookner, Norwalk, CT (US); Lorenz R. Frey, Zuchwil (CH)

(73) Assignee: Neopost Technologies, Bagneux (FR)

( * ) Notice: Subject to any disclaimer, the term of this patent is extended or adjusted under 35 U.S.C. 154(b) by 980 days.

(21) Appl. No.: 11/708,750

(22) Filed: Feb. 21, 2007

(65) Prior Publication Data
US 2008/0031460 A1    Feb. 7, 2008

Related U.S. Application Data

(63) Continuation of application No. 09/979,343, filed as application No. PCT/US00/13381 on May 16, 2000, now abandoned.

(60) Provisional application No. 60/135,953, filed on May 26, 1999.

(51) Int. Cl.
*H04L 9/08* (2006.01)
*H04L 29/12* (2006.01)
(52) U.S. Cl. .................. 380/286; 380/283; 380/279
(58) Field of Classification Search ............. 380/278, 380/283, 286
See application file for complete search history.

(56) References Cited

U.S. PATENT DOCUMENTS

| | | | |
|---|---|---|---|
| 5,241,597 A | 8/1993 | Bright | |
| 5,276,737 A | 1/1994 | Micali | |
| 5,557,346 A | 9/1996 | Lipner et al. | |
| 5,640,454 A * | 6/1997 | Lipner et al. | 380/286 |
| RE35,808 E | 5/1998 | Micali | |
| 5,764,767 A * | 6/1998 | Beimel et al. | 713/180 |
| 5,764,772 A * | 6/1998 | Kaufman et al. | 380/30 |
| 5,781,634 A | 7/1998 | Cordery et al. | |
| 5,815,573 A * | 9/1998 | Johnson et al. | 380/286 |
| 5,857,022 A | 1/1999 | Sudia | |
| 5,867,578 A * | 2/1999 | Brickell et al. | 713/180 |
| 5,937,066 A | 8/1999 | Gennaro et al. | |
| 5,956,403 A | 9/1999 | Lipner et al. | |
| 6,041,317 A | 3/2000 | Brookner | |
| 6,052,469 A | 4/2000 | Johnson et al. | |

OTHER PUBLICATIONS

Schneier et al., "Applied Cryptography," pp. 71-73.

* cited by examiner

*Primary Examiner* — Minh Dinh
*Assistant Examiner* — Venkat Perungavoor
(74) *Attorney, Agent, or Firm* — Morris & Kamlay LLP

(57) ABSTRACT

In a secure cryptographic environment, a private key in a private/public key cryptographic scheme needs to be backed up and recovered in case of a loss or corruption of the private key. To back up the private key, multiple key segments are generated based on the private key which are distributed to a corresponding number of trusted individuals, each of whom has knowledge of only his or her key segment. The key can be restored only when all of the trusted individuals provide the respective key segments, based on which the original private key is reconstructed. In addition, each trusted individual is uniquely identifiable by a personal identification number. Advantageously, the private key which is secret can be backed up and restored without any individual having knowledge of the full key.

12 Claims, 6 Drawing Sheets

TECHNIQUE FOR SPLIT KNOWLEDGE BACKUP AND RECOVERY OF A CRYPTOGRAPHIC KEY

This application is a continuation of U.S. application Ser. No. 09/979,343, filed Feb. 27, 2002, now abandoned which claims the benefit of International Application No. PCT/US00/13381, filed May 16, 2000 which designated the United States of America and was published in English as WO 00/74298A1, which claims the benefit of U.S. Provisional Application No. 60/135,953 filed on May 26, 1999.

TECHNICAL FIELD

The present invention is directed to a technique for secure communications, and in particular to a private/public key cryptographic scheme for such communications.

BACKGROUND OF THE INVENTION

In prior art, a postal security device (PSD) is used in a franking system for storing a fund therein for postage dispensation. When the stored fund runs out, a data center needs to be contacted to download more funds into the PSD such that it can continue to issue postage. Because of the sensitive nature of the communications between the PSDs and the data center, which involves the transfer of funds, the critical funds-related communications are typically encrypted and/or cryptographically signed.

For example, each PSD contains a private/public key set in accordance with a well known cryptographic methodology. The private key of each PSD is used to encrypt and cryptographically sign a message to be sent to the data center, which has knowledge of each PSD's public key. The data center decrypts and verifies the authenticity of the message using the public key associated with the particular PSD. The resulting cleartext message may contain, among others, a request for additional funds to be downloaded into the PSD. The data center then sends a response message to the PSD authorizing the further issuance of postage (i.e. downloading funds to the PSD). It is also typical that such a response message is cryptographically signed by the data center. To that end, the data center has at least one private key therein to sign the response message. The public key corresponding to such a private key is known by the PSDs served by the data center, and is used by the PSDs to authenticate the response message.

To prevent fraud and to ensure a secure environment, it is desirable that the private key of the data center be kept secret. Specifically, the private key is securely maintained in a module known as a security device (SD), which may be a secured personal computer (PC), in the data center. However, in the event of a loss of the private key, such as through tampering or equipment failure, absent any way to recover the key, it would be necessary to recall each PSD served by the data center to reprogram the PSD with a public key corresponding to the data center's new private key.

It is therefore desirable to provide a methodology to back up and recover the data center's private key which is secret in a secure manner which does not require divulgence of all or part of the private key.

SUMMARY OF THE INVENTION

In accordance with the invention, a cryptographic key, e.g., a private key, in the above-described data center, is processed to generate multiple data segments from which the cryptographic key is recoverable. At least one of the data segments is a function of a random number and at least part of the cryptographic key. The data segments are provided to trusted entities, e.g., individuals, for safe keeping thereof. Each entity has no knowledge of the data segment provided to another entity.

In the event that the cryptographic key is lost or corrupted, to recover the key, the trusted entities are required to input the respective data segments into a system where they are recombined to yield the original key. In accordance with an aspect of the invention, error checking is performed to verify that the recovered key is identical to the original key.

BRIEF DESCRIPTION OF THE DRAWING

Further objects, features and advantages of the invention will become apparent from the following detailed description taken in conjunction with the accompanying drawing, in which.

DETAILED DESCRIPTION

Figure 1:
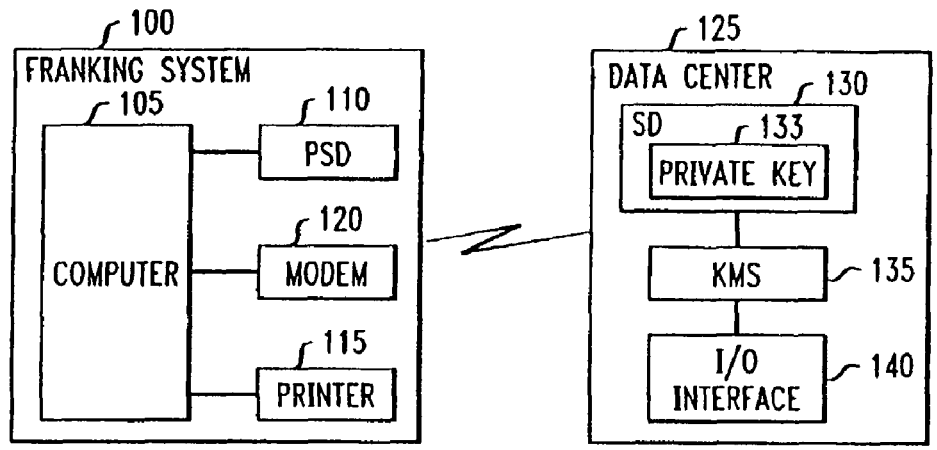
FIG. 1 illustrates an arrangement which includes a franking system capable of communicating with a data center in accordance with the invention.

FIG. 1 illustrates an arrangement embodying the principles of the invention. By way of example, this arrangement includes franking system 100 which in cooperation with data center 125 generates postage indicia serving as proof of postage. System 100 includes computer 105 of conventional design, printer 115, postal security device (PSD) 110 capable of authorizing printing of postage indicia on printer 115, and modem 120 for communications with data center 125. It should be appreciated that the arrangement of FIG. 1 may be used for a variety of purposes other than the printing of postage indicia. For example, the arrangement may also be used for issuing tickets such as lottery tickets and event tickets.

Data center 125 includes key management system (KMS) 135, security device (SD) 130, and I/O interface 140 for input/output of information. In accordance with the invention, KMS 135 and SD 130 interact with each other to provide the facility to back up and recover at least one cryptographic key, e.g., private key 133, stored in SD 130.

As is well known, PSD 110 is used for storing a fund therein for postage dispensation. When the stored fund runs out, PSD 110 needs to communicate with data center 125 to download more funds thereto such that it can continue to issue postage. Because of the sensitive nature of the communications between PSD 110 and data center 125, which involves the transfer of funds, the critical funds-related communications are encrypted and/or cryptographically signed. For example, KMS 135 in this instance cryptographically signs messages to PSD 110 using private key 133, in accordance with the well known digital signature algorithm (DSA) pursuant to the Digital Signature Standard (DSS), described in Federal Information Processing Standards Publication (FIPS Pub) 186-2. The resulting message may be authenticated in PSD 110 using the public key (not shown) therein corresponding to private key 133. It should be noted that one may utilize, instead of the DSA, the RSA or Elliptic Curve or other well known cryptographic methodology for data authentication purposes.

In prior art, in the event of a loss or corruption of a private key, e.g., private key 133, in a data center such as through tampering or equipment failure, it would be necessary to recall each PSD served by the data center to reprogram the PSD with a public key corresponding to the data center's new private key.

However, in accordance with the invention, multiple key segments are generated based on private key 133, which are respectively distributed to trusted entities, e.g., trusted users. Each trusted entity has no knowledge of others' key segments. Each key segment may be recorded in a recordable medium, e.g., a printout or a storage device. The original key can be restored only when all of the trusted entities produce the respective key segments, based on which the original key is reconstructed.

To that end, KMS 135 and SD 130 in data center 125 interact with each other to provide the facility to back up and recover private key 133 in accordance with the invention. The input and output of key segment information is accomplished using I/O interface 140. For example, in this instance key segment information is output from data center 125 in the form of a printout using a printer connected to interface 140.

Alternatively, the key segment information may be downloaded directly into a storage device connected to interface 140. Similarly, in this instance a trusted user may enter key segment information into data center 125 via a keyboard connected to interface 140 after the user reads from a printout recording the key segment information. Alternatively, it may be entered by direct communication from a storage device storing the key segment information through interface 140. It should also be noted that many other input/output methodologies may be used, instead.

In this illustrative embodiment, SD 130 is used to manage private key 133 and the key segment generation algorithms within its secure boundary. As a result, private key 133 is maintained in an environment separate from the processing system of KMS 135 which handles all interactions between SD 130 and the users, yet interconnected for normal working application. In addition, personal identification numbers (PINs) for identifying the trusted users are stored within SD 130. These PINs are preassigned to the users, respectively.

Specifically, SD 130 includes within its microprocessor system, among other software/firmware applications, critical security-related functionalities such as a library to carry out modular long integer mathematics; the capability of generating random numbers, which is compatible with FIPS Pub 140-1, or other accepted standard for self-tests of the random number generation capability; generation and verification of DSA signatures in accordance with the DSS, and all PIN related functions. In addition, SD 130 includes such specific functionalities as an identity-based access control mechanism based on the use of the PINS; a highly privileged function to output private key 133 for the key segmenting operation in accordance with the invention; a highly privileged function to enter key material for the key recovery operation; generation of error codes; and a self-test to check the correct segmentation of private key 133, e.g., by comparing bitwise private key 133 with the bitwise exclusive-OR value of key segments.

To back up private key 133 without compromising the security of the key or allowing anyone's access to the full key, two or more users are entrusted with key segments in accordance with the invention. Without loss of generality, in this example two users are entrusted with the following Key Segment 1 and Key Segment 2, respectively:

$$\text{Key Segment 1} = R; \tag{i}$$

$$\text{Key Segment 2} = R \oplus X, \tag{ii}$$

where R represents a random number or bit string; X represents private key 133; and the "$\oplus$" symbol represents a bitwise exclusive-OR operation.

It can be shown that X can be reconstructed or recovered based on Key Segment 1 and Key Segment 2 in the following manner:

$$X = \text{Key Segment 1} \oplus \text{Key Segment 2} \tag{iii}$$
$$= R \oplus (R \oplus X).$$

Figure 2:
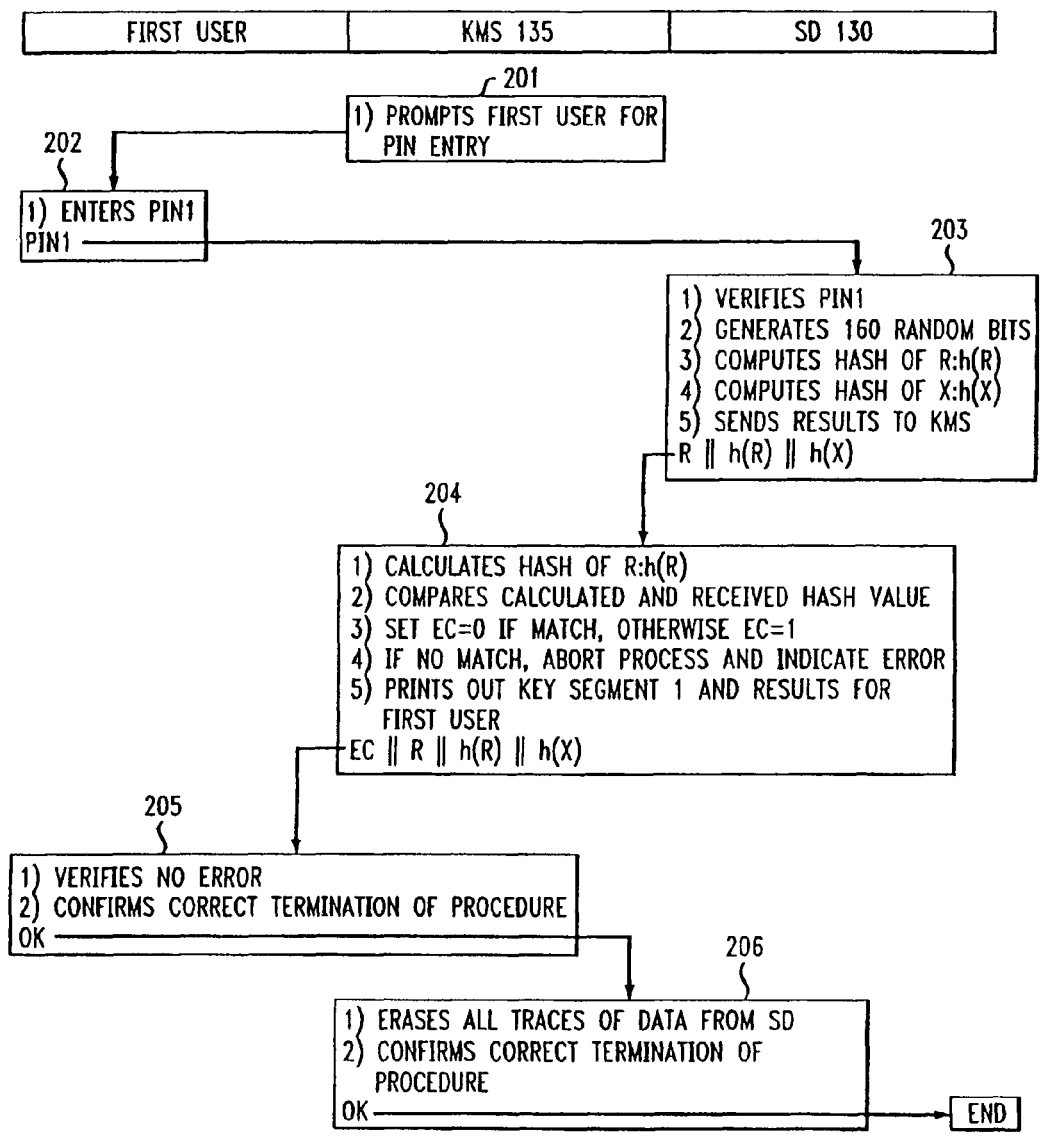
FIG. 2 is a flow diagram illustrating the process by which a first trusted entity obtains its key segment for recovering a private key in the data center.

FIG. 2 illustrates the process for generating Key Segment 1 for a first user in accordance with the invention, in box 201 KMS 135 prompts the first user for entry of his/her PIN. In box 202, the first user enters PIN1 identifying him/her through I/O interface 140. PIN1 is then sent to SD 130. In box 203, SD 130 verifies PIN1 by comparing it to the previously established PIN for the first user. SD 130 then generates a random number R.

In this illustrative embodiment, R is a 160 bit number, but a random number of another bit length may be used. Preferably, a true random number is generated by SD 130. However, the random number may be generated using a pseudorandom number generator, for example, the one described in Appendix C of ANSI standard X9.17 (Financial Institution Key Management (Wholesale)).

The hash of R is then computed, resulting in h(R). The hash function used in this illustrative embodiment is the secure hash algorithm (SHA-1) described in FIPS Pub 180-1. However, another well known secure one-way hash algorithm may be used, instead. SD 130 then computes the hash of private key 133, resulting in h(X). In this instance, private key 133 is a 160 bit number, although a key of another length may be utilized. The random number R, the hash of the random number h(R), and the hash of private key 133 h(X) are then sent to KMS 135. In box 204, KMS 135 independently calculates the hash of received random number R, and compares it with the received h(R) to ensure that there is a match. If there is no match, KMS 135 sets an error condition (EC) to 1. The process is then aborted and an error is indicated, e.g., through a display mechanism (not shown) connected to interface 140.

Otherwise, if there is a match, KMS 135 sets EC=0 and prints, for the first user, the values of EC, R, h(R) and h(X) on a printout in a predetermined format, e.g., in concatenation. Alternatively, the delivery of such values could be via an encrypted email function to the user requiring the user entry of a decryption key. In box 205, the first user verifies that no error has occurred, i.e., EC=0, and confirms the correct termination of the process. In box 206, KMS 135 erases or otherwise makes unavailable all traces of data from SD 130, which includes the random number R, and the hash values h(R) and h(X). KMS 135 also ensures that none of such data remains in any auxiliary device, for example, in a non-volatile memory of a printer. KMS 135 then confirms correct termination of the process. Thus, with the printout, the first user is in possession of Key Segment 1, i.e., R, along with the values h(R) and h(X) associated therewith.

Figure 3:
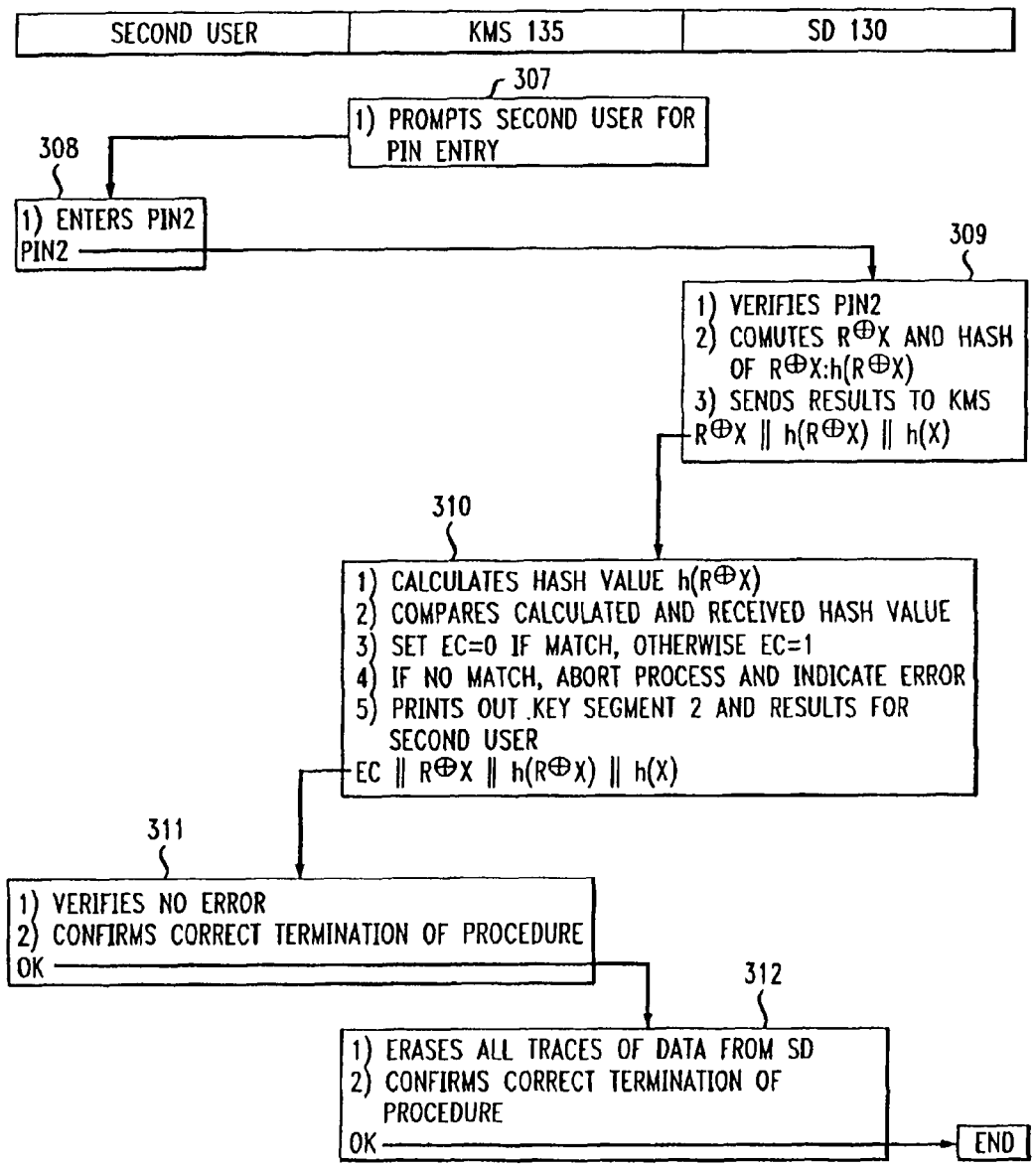
FIG. 3 is a flow diagram illustrating the process by which a second trusted entity obtains its key segment for recovering the private key.

FIG. 3 illustrates the process for generating Key Segment 2 for a second user in accordance with the invention. In box 307, KMS 135 prompts the second user for a PIN. In box 308, the second user enters his previously established PIN, denoted PIN2, which is sent to SD 130. In box 309, SD 130 verifies the identity of the second user by matching the received PIN2 with the previously established PIN for the second user. SD 130 then calculates the bitwise exclusive-OR of the random number R and private key X, and performs a hash function on the result. SD 130 sends to KMS 135 (a) the bitwise exclusive-OR of the random number R and private key X, i.e., R⊕X, (b) the hash of the bitwise exclusive-OR of the random number R and private key X, i.e., h(R⊕X), and (c) the hash of the private key X, i.e., h(X). In box 310, KMS 135 based on item (a) just received independently calculates h(R⊕X), and then compares the calculated value to item (b) just received from SD 130. If there is no match, KMS 135 sets EC=1. In addition, the process is aborted and an error is indicated.

Otherwise, if there is a match, KMS 135 sets EC=0, and prints, for the second user, the values EC, R⊕X, h(R⊕X) and h(x) on a printout in a predetermined format, e.g., in concatenation. In box 311, the second user verifies that there is no error, and then confirms the correct termination of the process. In box 312, KMS 135 erases all traces of data received from SD 130, and ensures that any auxiliary devices do not contain any such data. KMS 135 then confirms correct termination of the process to SD 130. Thus, with the printout, the second user is in possession of Key Segment 2, i.e., R⊕X, along with the values h(R⊕X) and h(X) associated therewith.

In this illustrative embodiment, Key Segments 1 and 2 and their associated hash values are respectively archived by the first and second users at separate locations geographically different from where SD 130 resides. The users independently secure their respective key segments and associated hash values, which may be encrypted and which may be recorded in printouts, storage devices or other recordable mediums. The latter may be kept in a secure environment, e.g., a safe, and each user has no access to the other's key segment information. In addition to the key segment and associated hash values, each user may record all necessary identification information, such as the date of generation of his/her key segment and the identification of the user receiving the key segment.

Figure 4:
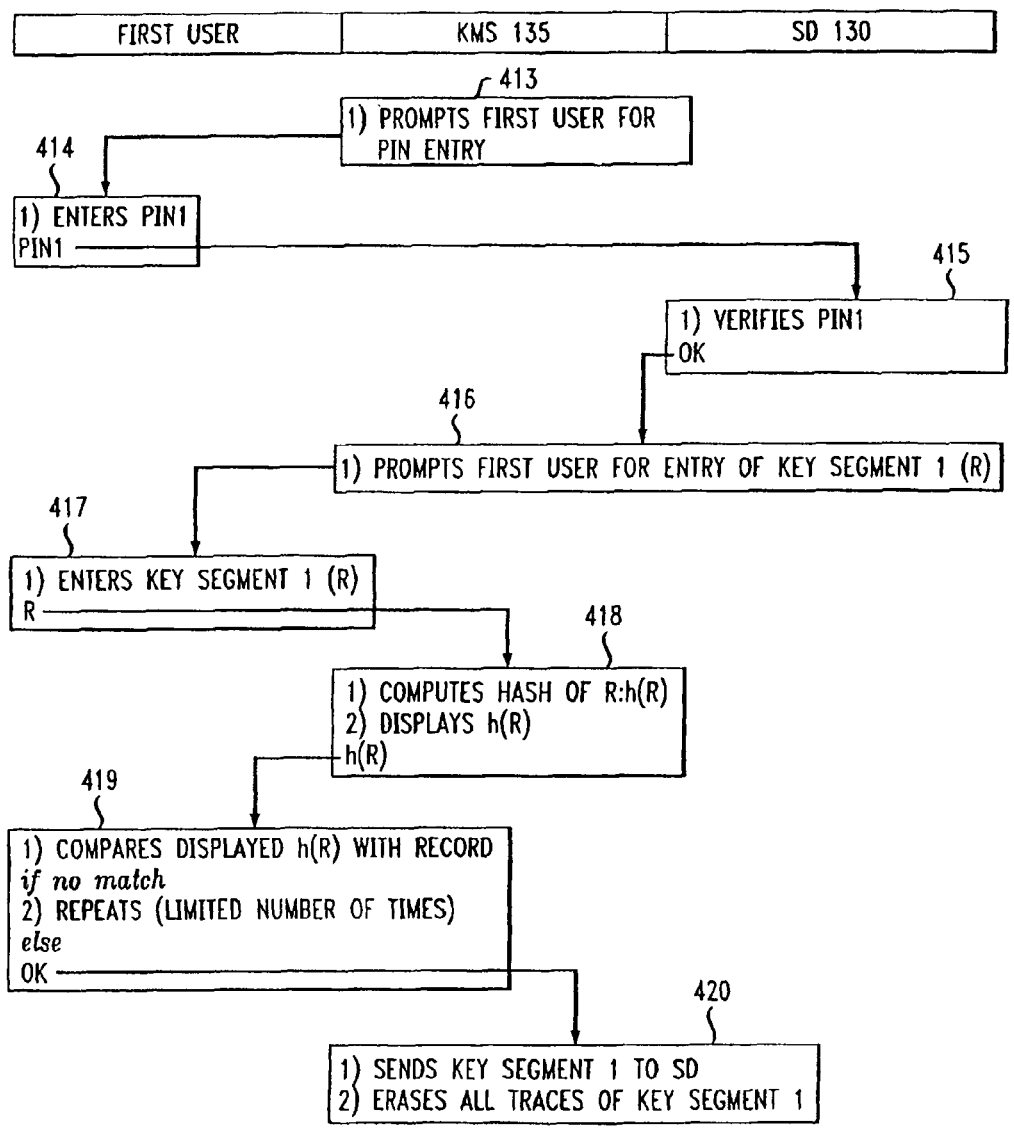
FIG. 4 is a flow diagram illustrating the process by which the first trusted entity inputs its key segment.

In the event that private key 133 is lost or corrupted in the memory of SD 130, both users need to correctly identify themselves and enter their key segments in order to reconstruct original key 133 in accordance with expression (iii) above. FIG. 4 illustrates a process whereby the first user enters Key Segment 1 to SD 130. In box 413, KMS 135 prompts the first user for entry of his/her PIN. In box 414, the first user enters PIN1, which is sent to SD 130. In box 415, SD 130 verifies whether the correct PIN has been entered, and indicates any success of the PIN verification to KMS 135. In box 416, KMS 135 prompts the first user for the entry of Key Segment 1, i.e., R. In box 417, the first user enters Key Segment 1 (R). In box 418, KMS 135 computes the hash of R and displays the result. In box 419, the first user compares the hash value generated by KMS 135 with the corresponding h(R) previously provided to him/her in the process of FIG. 2. If there is no match, then it is determined that an error has occurred, and the step in box 417 may be repeated by the user for a predetermined number of trials. When the predetermined number of trials is exceeded, the process is aborted. In box 420, KMS 135 sends Key Segment 1 (R) to SD 130, and erases all traces of Key Segment 1 from the memory of KMS 135 and any auxiliary devices used during the process.

Figure 5:
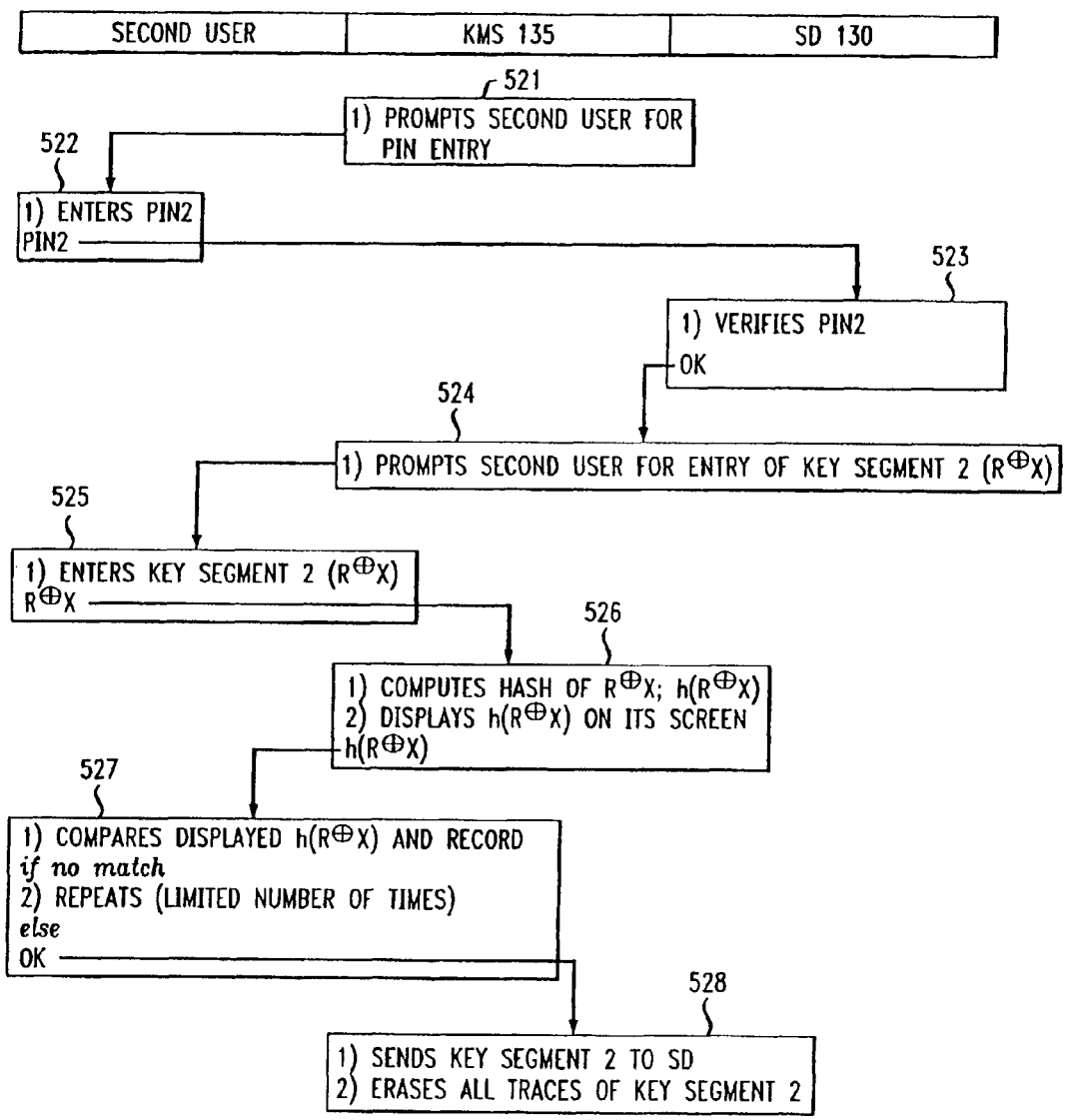
FIG. 5 is a flow diagram illustrating the process by which the second trusted entity enters its key segment.

FIG. 5 illustrates a process whereby the second user enters Key Segment 2 to SD 130. In box 521, KMS 135 prompts the second user for his/her PIN. In box 522, the second user enters PIN2, which is sent to SD 130. In box 523, SD 130 verifies whether the correct PIN has been entered and indicates any success of the verification to KMS 135. In box 524, KMS 135 prompts the second user for entry of Key Segment 2, i.e., R⊕X. In box 525, the second user enters Key Segment 2 (R⊕X) to KMS 135. In box 526, KMS 135 computes h(R⊕X) and displays the result. In box 527, the second user compares the hash value generated by KMS 135 with the corresponding h(R⊕X) previously provided to him/her in the process of FIG. 3. If there is no match, it is determined that an error has occurred, and the step in box 525 may be repeated by the second user for a predetermined number of trials. If the predetermined number of trials is exceeded, the process is aborted. In box 528, KMS 135 sends Key Segment 2 (R⊕X) to SD 130 and erases all traces of Key Segment 2 from the memory of KMS 135 and any auxiliary devices used during the process.

Figure 6:
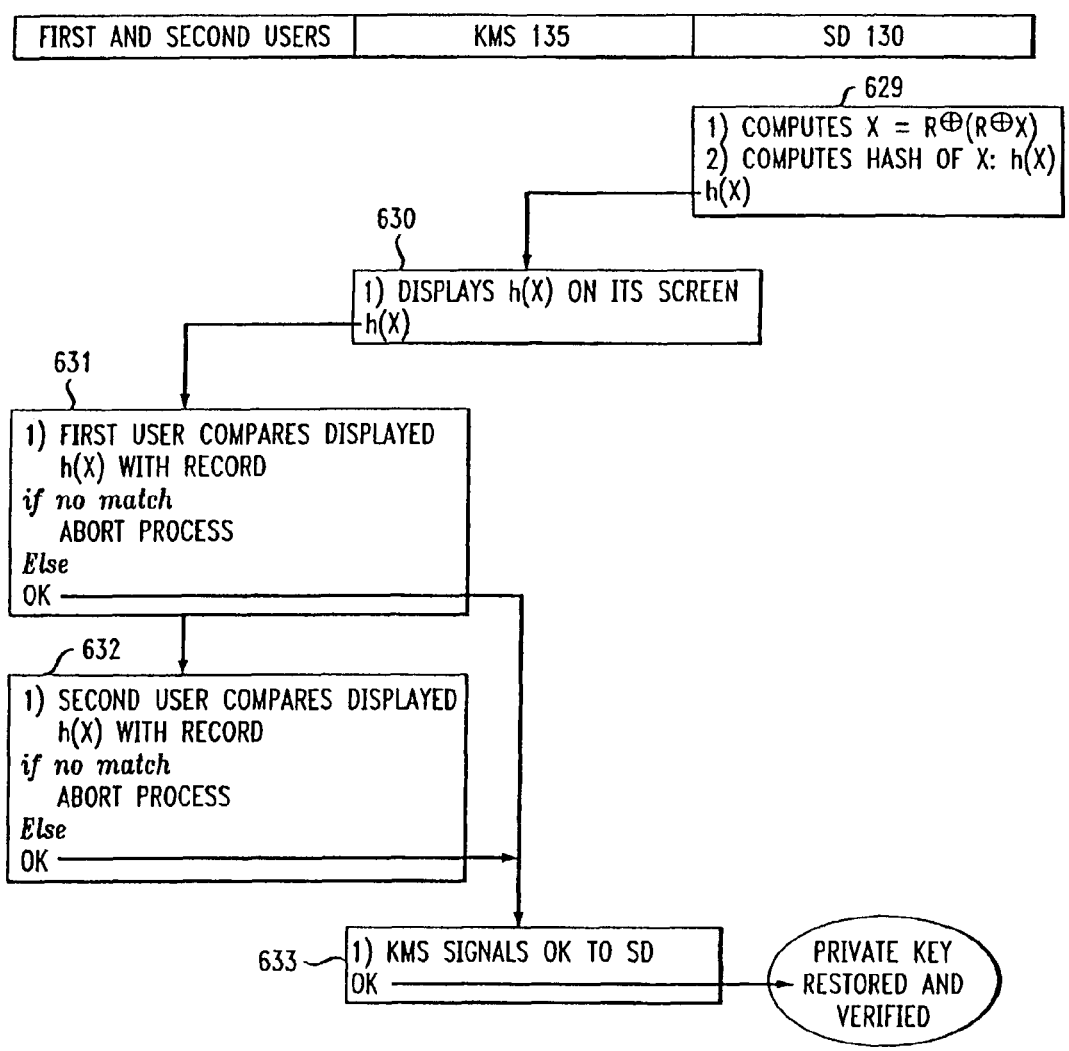
FIG. 6 is a flow diagram illustrating a process for verifying that a restored private key is identical to the original private key.

FIG. 6 illustrates the process used for recovering private key 133 and verification of the recovered private key. In box 629, SD 130 recovers private key X by performing a bitwise exclusive-OR of Key Segment 1 (R) entered by the first user and Key Segment 2 (R⊕X) entered by the second user, in accordance with expression (iii) above. SD 130 then computes the hash value of the recovered private key X, i.e., h(X), and sends it to KMS 135. In box 630, KMS 135 displays the computed h(X). In box 631, the first user compares the displayed hash value with the corresponding h(X) previously provided to him/her in the process of FIG. 2. In box 632, the second user similarly compares the displayed hash value with the corresponding h(X) previously provided to him/her in the process of FIG. 3. This comparison by each of the users is performed independently, without either user seeing the other's record. If the respective comparisons by the users both result in a match, in box 633 KMS 135 signals to SD 130 that private key 133 is restored and verified. Otherwise, if any of the comparisons does not result in a match, the process is aborted.

Figure 7A:
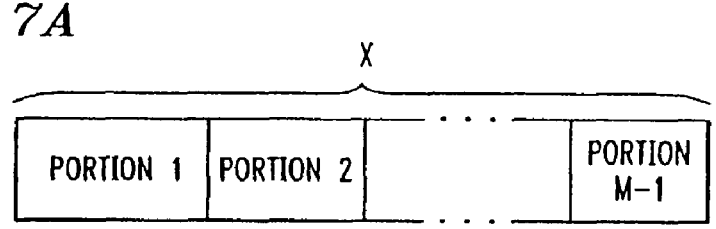
FIGS. 7A and 7B jointly illustrate a process for deriving key segments from the original private key.
Figure 7B:
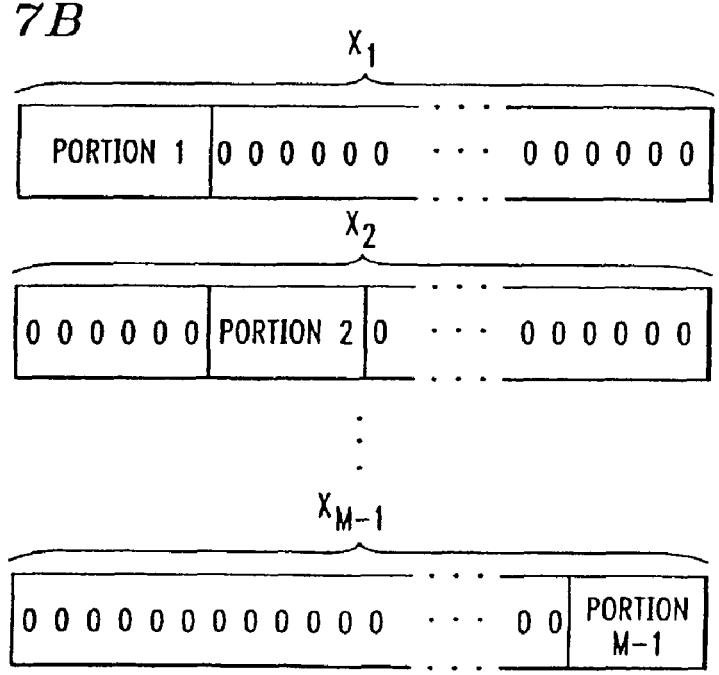

In general, in accordance with the invention, M users are entrusted with key segments, respectively, based on which the original key is recovered, where M represents an integer greater than or equal to two. Although the above example fully describes the M=2 case, M>2 cases similarly follow. For instance, in an M>2 case, M users may be entrusted with the respective M key segments as follows:

Key Segment 1=R;

Key Segment 2=R⊕$X_1$;

Key Segment 3=$X_2$;

Key Segment M=$X_{M-1}$.

where R represents a random number or bit string as before; and $X_1, X_2 \ldots$ and $X_{M-1}$ represent derivatives of private key 133, respectively. FIGS. 7A and 7B jointly illustrate the process whereby $X_1, X_2 \ldots$ and $X_{M-1}$ are derived from private key 133, denoted X.

As shown in FIG. 7A, X is divided into M−1 portions, denoted portion 1, portion 2, . . . , and portion M−1. It should be noted that portions 1 through M−1 may be in different lengths. As shown in FIG. 7B, $X_1$ is a bit string as long as X, which includes the same bits and their bit positions as portion 1 of X, with the rest of the bit string stuffed with bits "0". Similarly, $X_2$ is a bit string which includes the same bits and their bit positions as portion 2 of X, with the rest of the bit string stuffed with bits "0"; . . . ; and $X_{M-1}$ is a bit string which includes the same bits and their bit positions as portion M−1 of X, with the rest of the bit string stuffed with bits "0". It is apparent from the disclosure heretofore that the process whereby each of users 3 through M obtains the key segment corresponding to the user is similar to that of FIG. 3, with Key Segment 2 replaced by the corresponding key segment.

It can be shown that X can be reconstructed or recovered based on Key Segments 1 through M in the following manner:

$$X = \text{Key Segment 1} \oplus \text{Key Segment 2} \oplus \text{Key Segment 3} \oplus \ldots \oplus \text{Key Segment } M$$
$$= R \oplus (R \oplus X_1) \oplus X_2 \oplus \ldots \oplus X_{M-1}$$

It is also apparent from the disclosure heretofore that the process whereby each of users 3 through M enters the corresponding key segment into SD 130 for recovering X is similar to that of FIG. 5, with Key Segment 2 replaced by the corresponding key segment. In addition, the restoration of X and verification of the recovered X here are similar to those described in FIG. 6.

The foregoing merely illustrates the principles of the invention. It will thus be appreciated that those skilled in the art will be able to devise numerous other arrangements which embody the principles of the invention and are thus within its spirit and scope.

For example, the invention is readily understood when presented in the context of a franking system. However, the invention generally applies to other systems and methods where the integrity of a cryptographic key is important, and a secure backup of such a cryptographic key is desirable.

In addition, the key segments received by the trusted entities may be weighted. For example, in a three-key-segment scheme, one key segment may be privileged or accorded more weight than the other two key segments in that it would allow recovery of private key 133 based on the privileged key segment, combined with either of the other two key segments.

Finally, system 100 and data center 125 are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriate memories, and/or appropriately programmed processors.

The invention claimed is:

1. A method for storing and retrieving a cryptographic private key, comprising:
    calculating a one-way hash value of an initial cryptographic private key;
    generating by a microprocessor a plurality of key segments within a secure boundary of a first device, at least a first of the plurality of key segments being a random number, and at least a second of the plurality of key segments being a combination of the random number and a portion of the initial cryptographic private key;
    distributing each of the plurality of key segments from the first device to one of a plurality of trusted users outside the secure boundary of the first device; and
    when the cryptographic private key is to be recovered:
        receiving at the first device the plurality of key segments from the plurality of trusted users;
        generating by a microprocessor a recovered key from the plurality of key segments within the secure boundary of the first device;
        calculating a one-way hash value of the recovered key;
        comparing the hash value of the recovered key to the hash value of the initial cryptographic private key; and
        if the hash value of the recovered key is the same as the hash value of the initial cryptographic private key, using the recovered key as the private key in a cryptographic communication system;
    wherein the cryptographic private key is at least initially maintained in a data center and is configured as an encoding key for use with a plurality of postal security devices (PSDs) that communicate with the data center for replenishment of postage funds, each of the PSDs having a cryptographic public key corresponding to the cryptographic private key; and
    using the recovered key as the private key in the cryptographic communication system includes the data center replenishing postage funds in at least one of the plurality of PSDs using the recovered key as the private key.

2. The method of claim 1, wherein the second of the plurality of key segments is generated using a bitwise exclusive-OR operation performed between the portion of the initial cryptographic private key and the random number.

3. The method of claim 1, wherein distributing each of the plurality of key segments comprises transferring each of the plurality of key segments to one of the plurality of trusted users such that no trusted user receives more than one of the key segments.

4. The method of claim 1, wherein each of the plurality of trusted users has no knowledge of key segments received by the other trusted users.

5. The method of claim 1, wherein the plurality of key segments are received from the plurality of trusted users in response to the initial cryptographic private key being lost or corrupted, and generating the plurality of key segments includes:
    for the first key segment:
        receiving a first PIN from a first trusted user of the plurality of trusted users;
        verifying the first PIN within the secure boundary of the first device;
        calculating a first hash value of the random number within the secure boundary of the first device;
        sending the random number, the first hash value of the random number, and the cryptographic private key to a key management system of the first device;
        calculating a second hash value of the random number by the key management system;
        validating the received random number in the key management system by comparing the first hash value of the random number and the second hash value of the random number; and
    for the second key segment:
        receiving a second PIN from a second trusted user of the plurality of trusted users;
        verifying the second PIN within the secure boundary of the first device;
        calculating a first hash value of the combination of the random number with the portion of the initial cryptographic private key within the secure boundary of the first device;

sending the combination of the random number with the portion of the initial cryptographic private key, the first hash value of the combination of the random number with the portion of the initial cryptographic private key, and the cryptographic private key to a key management system of the first device;

calculating a second hash value of the combination of the random number with the portion of the initial cryptographic private key by the key management system;

validating the received combination of the random number with the portion of the initial cryptographic private key in the key management system by comparing the first hash value of the combination of the random number with the portion of the initial cryptographic private key and the second hash value of the combination of the random number with the portion of the initial cryptographic private key.

6. The method of claim 1, wherein at least a third of the plurality of key segments is a bit string comprising a second portion of the initial cryptographic private key.

7. The method of claim 5, wherein distributing the plurality of key segments includes:

distributing the first hash value of the random number, and the hash value of the initial cryptographic private key to the first trusted user;

distributing the first hash value of the combination of the random number with the portion of the initial cryptographic private key, and the hash value of the initial cryptographic private key to the second trusted user;

receiving a confirmation from the first trusted user that the random number, the first hash value of the random number and the hash value of the initial cryptographic private key have been successfully received;

receiving a confirmation from the second trusted user that the first hash value of the combination of the random number with the portion of the initial cryptographic private key, and the hash value of the initial cryptographic private key have been successfully received; and deleting the random number, the first hash value of the random number, the first hash value of the combination of the random number with the portion of the initial cryptographic private key, and the hash value of the initial cryptographic private key from a memory of the key management system based on the confirmations received from the first and second trusted users.

8. A system for storing and recovering a cryptographic private key, comprising:

a microprocessor;

a data center configured to securely communicate with a plurality of postal security devices (PSDs); and a computer-readable storage medium bearing computer-executable instructions configured for:

calculating a one-way hash value of an initial cryptographic private key;

generating by the microprocessor a plurality of key segments within a secure boundary of a first device, at least a first of the plurality of key segments being a random number, and at least a second of the plurality of key segments being a combination of the random number and a portion of an initial cryptographic private key;

distributing each of the plurality of key segments from the first device to one of a plurality of trusted users outside the secure boundary of the first device; and when the cryptographic private key is to be recovered:

receiving at the first device the plurality of key segments from the plurality of trusted users;

generating by a microprocessor a recovered key from the plurality of key segments within the secure boundary of the first device;

calculating a one-way hash value of the recovered key;

comparing the hash value of the recovered key to the hash value of the initial cryptographic private key; and if the hash value of the recovered key is the same as the hash value of the initial cryptographic private key, using the recovered key as the private key in a cryptographic communication system;

wherein the cryptographic private key is at least initially maintained in the data center and is configured as an encoding key for use with the plurality of PSDs for replenishment of postage funds, each of the PSDs having a cryptographic public key corresponding to the cryptographic private key; and the system is further configured to replenish postage funds in at least one of the plurality of PSDs using the recovered key as the private key.

9. The system of claim 8, further comprising instructions for calculating a one-way hash value of the initial cryptographic private key.

10. The system of claim 8, wherein the system is configured to generate the second of the plurality of key segments using a bitwise -OR exclusive operation performed between the portion of the initial cryptographic private key and the random number.

11. The system of claim 8, wherein each of the plurality of trusted users has no knowledge of key segments received by the other trusted users.

12. A method for storing and retrieving a cryptographic private key, comprising:

calculating a one-way hash value of an initial cryptographic private key;

generating by a microprocessor a plurality of key segments within a secure boundary of a first device, at least a first of the plurality of key segments being a random number, and at least a second of the plurality of key segments being a combination of the random number and a portion of the initial cryptographic private key;

distributing each of the plurality of key segments from the first device to one of a plurality of trusted users outside the secure boundary of the first device; and when the cryptographic private key is to be recovered:

receiving at the first device the plurality of key segments from the plurality of trusted users;

generating by a microprocessor a recovered key from the plurality of key segments within the secure boundary of the first device;

calculating a one-way hash value of the recovered key;

comparing the hash value of the recovered key to the hash value of the initial cryptographic private key; and if the hash value of the recovered key is the same as the hash value of the initial cryptographic private key, using the recovered key as the private key in a cryptographic communication system;

wherein comparing the hash value of the recovered key to the hash value of the initial cryptographic private key includes receiving the hash value of the initial cryptographic private key from at least one of the plurality of trusted users.

* * * * *